(12) United States Patent
Walker et al.

(10) Patent No.: US 6,494,562 B1
(45) Date of Patent: Dec. 17, 2002

(54) METHOD AND APPARATUS FOR IDENTIFYING A SALES CHANNEL

(75) Inventors: Ray A. Walker, Eugene, OR (US); Robert E. Haines, Boise, ID (US); Michael L. Bullock, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/410,989

(22) Filed: Oct. 1, 1999

Related U.S. Application Data (63) Continuation-in-part of application No. 09/295,080, filed on Apr. 20, 1999, which is a continuation-in-part of application No. 09/148,039, filed on Sep. 3, 1998, now Pat. No. 6,039,430.

(51) Int. Cl.$^7$ ................................. B41J 2/165
(52) U.S. Cl. ........................................ 347/32
(58) Field of Search ................ 347/32, 19, 7, 347/20, 28, 29; 400/208; 399/8, 12, 24; 705/1, 26, 27, 29

(56) References Cited

U.S. PATENT DOCUMENTS

| | | | |
|---|---|---|---|
| 4,857,893 A | | 8/1989 | Carroll .................. 340/572 |
| 5,049,898 A | * | 9/1991 | Authur et al. ............ 347/19 |
| 5,528,222 A | | 6/1996 | Moskowitz et al. ...... 340/572 |
| 5,610,635 A | * | 3/1997 | Murray et al. ............. 347/7 |
| 5,682,140 A | | 10/1997 | Christensen et al. ..... 340/540 |
| 5,788,388 A | | 8/1998 | Cowger et al. .......... 400/703 |
| 5,838,253 A | | 11/1998 | Wurz et al. ......... 340/825.54 |
| 5,845,263 A | * | 12/1998 | Camaisa et al. .......... 705/15 |
| 5,875,430 A | * | 2/1999 | Koether ................... 700/2 |
| 5,930,553 A | | 7/1999 | Hirst et al. ............... 399/8 |
| 5,991,601 A | * | 11/1999 | Anderson ............ 235/462.01 |
| 6,026,366 A | * | 2/2000 | Grube .................... 705/10 |
| 6,039,430 A | * | 3/2000 | Helterline et al. ......... 347/19 |
| 6,094,639 A | * | 7/2000 | Kubota ..................... 705/1 |
| 6,298,332 B1 | * | 10/2001 | Montague ................. 705/1 |
| 6,349,298 B1 | * | 2/2002 | Malone et al. ............ 345/762 |

FOREIGN PATENT DOCUMENTS

| | | | |
|---|---|---|---|
| EP | 0878305 A2 | 11/1998 | .................... 2/5 |
| GB | 2283344 A | 10/1993 | .................... 16/6 |
| WO | WO97/28001 | 8/1997 | .................. 2/175 |
| WO | WO 98/52762 | 11/1998 | ............. B41J/2/01 |

OTHER PUBLICATIONS

"RFID: Everything You Need to Know," Motorola, Inc., Nov. 11, 1997 (18 pgs.).
"MicroStamp 4000–1 Interrogator, Technical Information," Micron communications, Inc., Sep. 1, 1998 (13 pgs.).
Hook, Chris, "The Application of RFID Tags as Anti-Counterfeiting Devices," Texas Instruments, http://www.ti.com, Oct. 1, 1999.

* cited by examiner

*Primary Examiner*—John S. Hilten
*Assistant Examiner*—K. Feggins
(74) *Attorney, Agent, or Firm*—Kevin B. Sullivan (57) ABSTRACT

The present disclosure relates to a replaceable printing component for use in a printing system having at least one replaceable printing component. The replaceable printing component is of the type sold through a plurality of sales channels. The replaceable printing component includes a radio frequency link for receiving information indicative of a particular sales channel of a plurality of sales channels. Also included in the replaceable printing component is an electrical storage device for storing information indicative of the particular sales channel. The electrical storage device provides information indicative of the particular sales channel for reordering the replaceable printing component.

15 Claims, 8 Drawing Sheets

| | |
|---|---|
| 0000 | Component Identifier |
| 0001 | Reseller Identification |
| 0002 | |
| ⋮ | ⋮ |
| ⋮ | |
| XXXX | |

METHOD AND APPARATUS FOR IDENTIFYING A SALES CHANNEL

CROSS REFERENCE TO RELATED APPLICATIONS

The present application is a continuation-in-part of United States patent application Ser. number 09/295,080 filed Apr. 20, 1999, entitled "Method And Apparatus For Transferring Information Between A Replaceable Consumable And A Printing Device", now pending, and a continuation-in-part of United States patent application Ser. No. 09/148,039 filed Sep. 3, 1998, entitled "Method And Apparatus For Storing And Retrieving Information On A Replaceable Printing Component", now U.S. Pat. No. 6,039,430, both of which are assigned to the assignee of the present invention, and incorporated herein by reference.

BACKGROUND OF THE INVENTION

This invention relates to printing systems that make use of a replaceable printing component. More particularly, the present invention relates to a replaceable printing component that includes a radio frequency link for receiving sales channel information and storing this information in a memory device.

One type of printing system commonly used is an inkjet printing system. Inkjet printing systems typically include an inkjet printhead that is mounted within a scanning carriage that is moved back and forth across print media such as paper. As the printhead is moved or scanned across the print media, a control system activates the printhead to deposit or eject ink droplets onto the print media to form images and text. Ink is provided to the printhead by a supply of ink that is either carried by the scanning carriage or mounted to the printing system in a manner that does not move with the scanning carriage. Where the ink supply is not carried with the scanning carriage, the ink supply is either intermittently or continuously connected to the printhead for replenishing the printhead with ink. In either case, the replaceable printing components such as the ink container and the printhead require periodic replacement. The ink supply is typically replaced when exhausted, and the printhead is typically replaced at the end of printhead life.

Another type of printing system that is commonly used is an electrophotographic printing system. The electrophotographic printing system is typically includes an electrophotographic printing engine. The electrophotgraphic printing engine often includes an intermediate imaging device such as a drum and a supply of imaging material such as toner. The drum is charged using an energy source such as a scanning laser. Imaging material is attracted to the charged drum and is then transferred to print media. A fusing device binds the imaging material to the print media. Replaceable printing components such as a supply of imaging material frequently included, among other things, in a cartridge, referred to as a toner cartridge, are typically replaced when exhausted. Other replaceable printing components such as the intermediate imaging device, fusing device, and various components subject to wear are typically replaced at end of life.

Regardless of whether the printing system is an inkjet printing system or an electrophotographic system, the replaceable printing component must be replaced when exhausted. The replaceable printing component is typically sold through one of a number of sales channels. Each sales channel typically includes one or more distributors and a reseller or service provider. Each reseller or service provider typically offers a variety of replaceable printing components manufactured or distributed under different brands. Because of limited shelf space, these resellers or service providers typically offer or carry fewer brands than those from which they have to choose.

It is important that the manufacturers of each brand provide some incentive for the reseller or service provider to stock or carry its brand in order to ensure sales of that brand. Manufacturers that provide less incentive to the reseller for stocking their brands can get overlooked, resulting in lost sales.

There is an ever-present need for techniques to build brand loyalty with the resellers or service providers. These techniques should provide an incentive for the reseller to carry a particular brand over other brands. In addition, this technique should be reliable and result in relatively low manufacturing costs to maintain a relatively low printing cost per page.

SUMMARY OF THE INVENTION

The present invention includes a replaceable printing component for use in a printing system having at least one replaceable printing component. The replaceable printing component is of the type sold through a plurality of sales channels. The replaceable printing component includes a radio frequency link for receiving information indicative of a particular sales channel of a plurality of sales channels. Also included in the replaceable printing component is an electrical storage device for storing information indicative of the particular sales channel. The electrical storage device provides information indicative of the particular sales channel for reordering the replaceable printing component.

In one preferred embodiment, the replaceable printing component is an inkjet print cartridge. In another preferred the embodiment, the replaceable printing component is an electrophotographic printing cartridge. In yet another preferred embodiment, the radio frequency link is configured for receiving data encoded in a radio frequency signal in a serial fashion.

DETAILED DESCRIPTION OF THE PREFERRED EMBODIMENT

Figure 1:
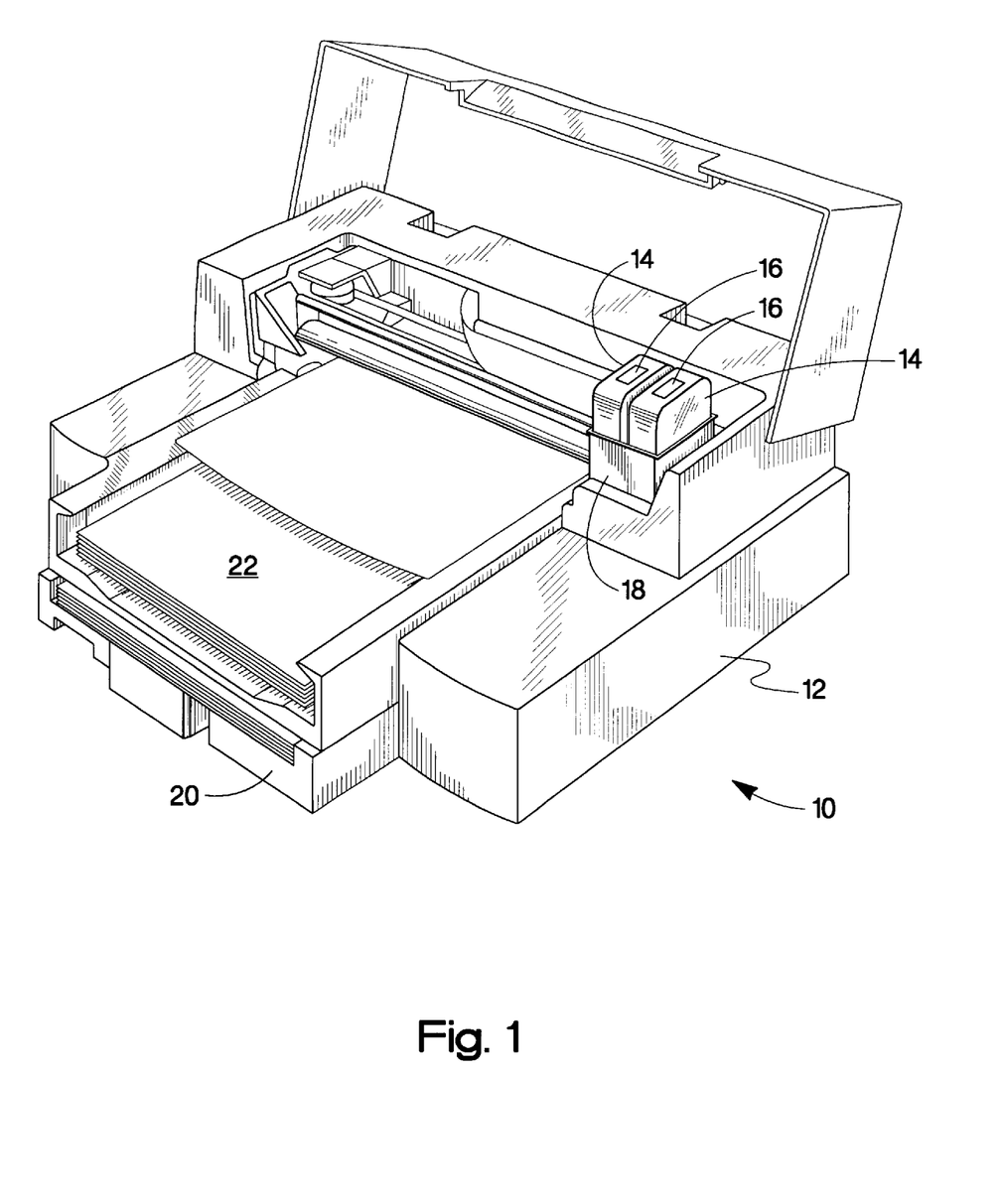
FIG. 1 is an exemplary printing system of the present invention that incorporates a replaceable printing component, shown in a top perspective view with a printer cover open.

FIG. 1 is a perspective view of one exemplary embodiment of a printing system 10 of the present invention shown with its cover open. The printing system 10 includes a printer portion 12 having one or more replaceable printing components 14 installed therein. The printer portion 12, together with the replaceable printing component 14, accomplishes printing on print media. Each printing component 14 includes a sales channel or reseller identification device 16 for storing information identifying a reseller or service provider of the printing system 10 for use in ordering replacement replaceable printing components 14. In one exemplary embodiment, the printing system 10 as shown in FIG. 1, is an inkjet printing system. However, the present invention, as will be described herein, is applicable to a variety of other types of printing systems 10 such as electrophotographic printing systems. The inkjet printing system 10 as shown and described herein is used merely to illustrate the method and apparatus of the present invention. After the method and apparatus of the present invention is described with respect to the inkjet printing system, the application of the method and apparatus of the present invention to other types of printing systems will be discussed briefly.

Where the printing system 10 is an inkjet printing system such as shown in FIG. 1, the replaceable printing component 14 is an inkjet print cartridge that includes an inkjet printhead and an ink reservoir in fluid communication with the printhead (not shown). The inkjet print cartridge 14 is installed in a scanning carriage 18 and is moved relative to a print media. The inkjet printer portion 12 includes a media tray 20 for receiving the print media 22. As media is stepped through the print zone, the scanning carriage moves the print cartridges 14 relative to the print media 22. The printer portion 12 selectively activates the printhead portion associated with the print cartridge 14 to deposit ink on print media to thereby accomplish printing.

The printing system shown in FIG. 1 is shown with 2 replaceable printing components 14 representing a print cartridge for black ink and a 3-color print cartridge containing cyan, magenta, and yellow inks, together accomplishing 4-color printing. The method and apparatus of the present invention is applicable to printing systems 10 that make use of other arrangements such as printing systems that use greater or less than 4-ink colors, such as in high fidelity printing which typically uses 6 or more colors. In either case, the printing system 10 includes 1 or more replaceable printing components 14, each having a reseller identification device 16 associated with that printing component 14.

The method and apparatus of the present invention is applicable to inkjet printing systems 10 having other configurations than those shown in FIG. 1. For example, the replaceable printing component 14 can be a printhead portion that is mounted on the scanning carriage 18, or a separate ink reservoir portion which is mounted off the scanning carriage that is in fluid connection either intermittently or continuously with the printhead portion. In this case, each of the printhead portion and the ink reservoir portion is a separate replaceable printing component 14 with each replaceable printing component 14 having a reseller identification device 16 associated therewith. The ink reservoir portion is replaced when the ink is exhausted and the inkjet printhead portion is replaced at end of life.

Figure 2:
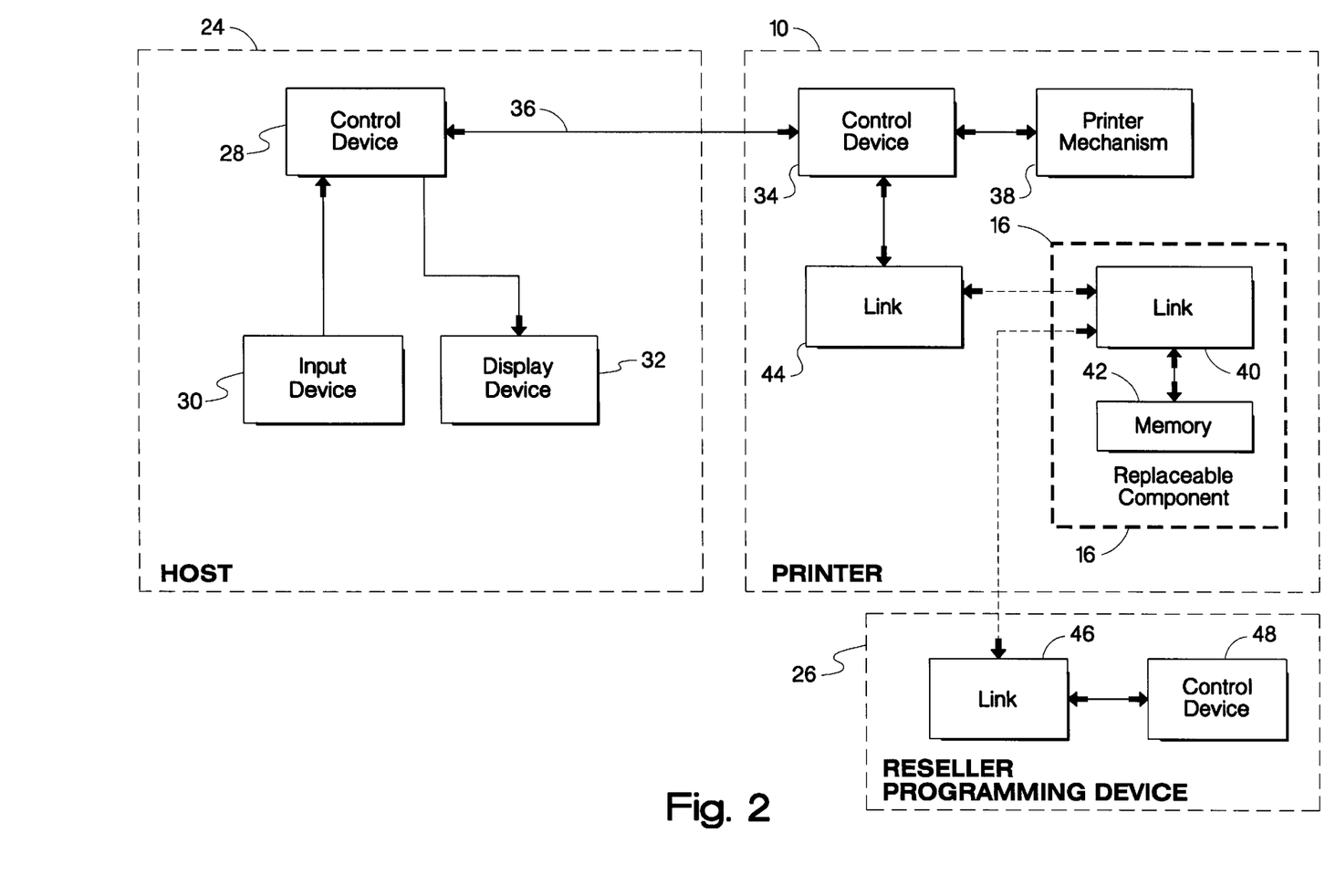
FIG. 2 is a simplified electrical block diagram of the printing system shown in FIG. 1 shown connected to a host device and shown linked to a reseller programming device.

FIG. 2 is a simplified block diagram of the printing system 10 of the present invention shown connected or otherwise linked to an information source or host device 24 and a reseller programming device 26. The information source 24 provides information such as image descriptions to the printing system 10 for printing on print media. The reseller programming device 26 provides information indicative of the sales channel that is stored in the reseller identification device 16. This sales channel information identifies the sales channel or particular reseller of the replaceable printing component 14. The replaceable printing component 14 stores this sales channel or reseller identification information within the replaceable printing component 14 for use later at reorder time. When the replaceable printing component 14 is exhausted or when additional replaceable printing components 14 are reordered, the sales channel or reseller information is retrieved from the replaceable printing component 14 to identify the reseller.

The method and apparatus of the present invention tends to build brand loyalty for the manufacturer. Because customers of the replaceable printing component 14 are pointed back to the reseller of the replaceable component 14, the resellers benefit from selling replaceable components 14 that incorporate this reseller identification feature. In addition, the manufacturer benefits because resellers will prefer selling replaceable components 14 from the manufacturer that makes use of the reseller identification feature. Finally, the customers of the replaceable printing component 14 benefit by the reseller identification feature because the customer will always know where a replacement printing component 14 can be obtained.

In the preferred embodiment, the information source 24 includes a control device 28 and an input device 30 and a display device 32. The control device 28 control device 34 associated with the printing system 10. The control device 28 is often connected to a display device 32 such as a monitor and receives input from the input device 30 such as a keyboard or some other such input device. The information source 24 can be source of information that is acceptable by the printing system 10 such as a personal computer, workstation, web appliance, digital camera or server, to name a few, that provides image information to the printing system 10 for printing. The information source 24 is connected to the printing system by way of a data link 36. The data link 36 can be any one of a variety of data links such as an electrical link or an infrared link for transferring information between the information source 24 and the printing system 10.

The printing system 10 includes the control device 34 for receiving image information from the information source 24 and controlling a printer mechanism 38 accordingly for forming images on print media. The control device 34 associated with the printing system 10 in the case of an inkjet printer formats this image information and stores this image information for controlling various printing system 10 functions to accomplish printing. These printing system 10 functions include controlling the motion of the scanning carriage 18, controlling the media feed to step print media 22 through a print zone and activating the printhead to deposit ink on print media so as to form an image on print media which corresponds to image information received from the information source.

In the preferred embodiment, the reseller identification device 16 includes a linking device 40 and an electrical storage device 42. The linking device 40 and a corresponding linking device 44 associated with the printing system 10 allow information to be transferred between the control device 34 and the electrical storage device 42 without direct electrical contact. Among the information passed between the electrical storage device 42 and the control device 34 via the linking devices 40 and 44 is sales channel information such as information specifying the reseller identification and information specifying the particular replaceable printing component 14. The electrical storage device 42 is a device for storing and retrieving information such as semiconductor memory.

The linking devices 44 and 40 allow reseller identification and component identification such as model number to be retrieved from the electrical storage device 42 either upon the occurrence of a condition such as a low ink condition or upon customer request for this information. The customer can request reseller identification information such as using the information source 24 to make a request or through the use of an input device such as a switch that provides a request for reseller information to the control device 34. In response to the request for reseller information the control device 34 retrieves the reseller information for either printing this information using the printer mechanism 38 or displaying this information on the display device 32 associated with the information source 24 or displaying this information on a display device (not shown) associated with the printing system 10. The display device associated with the printing system 10 can be a liquid crystal display (LCD) or some other suitable display for displaying sales channel information such as reseller identification for the customer. The customer can then use this reseller information to contact the reseller to request a replacement component 14 from the reseller.

The reseller programming device 26 includes a linking device 46 and a control device 48. Information is transferred between the control device 48 and the electrical storage device 42 by transferring information between the linking devices 46 and 40. The linking devices 46 and 40 allow information to be transferred between the reseller programming device 26 and the printing system 10 without direct electrical interconnection. In the preferred embodiment, information specifying the reseller identification and the component identification for the replaceable printing component 14 is sent from the reseller programming device 26 to the electrical storage device 42. The reseller identification and component identification information is stored in the reseller identification device 16 either at the time of purchase of the replaceable printing component 14 or prior to purchase of the replaceable printing component 14 but after the reseller is identified. In one preferred embodiment, at the time of purchase, the reseller identification and component identification are stored in the memory device 42 for use by the customer when reordering of replaceable printing components is necessitated.

Figure 3:
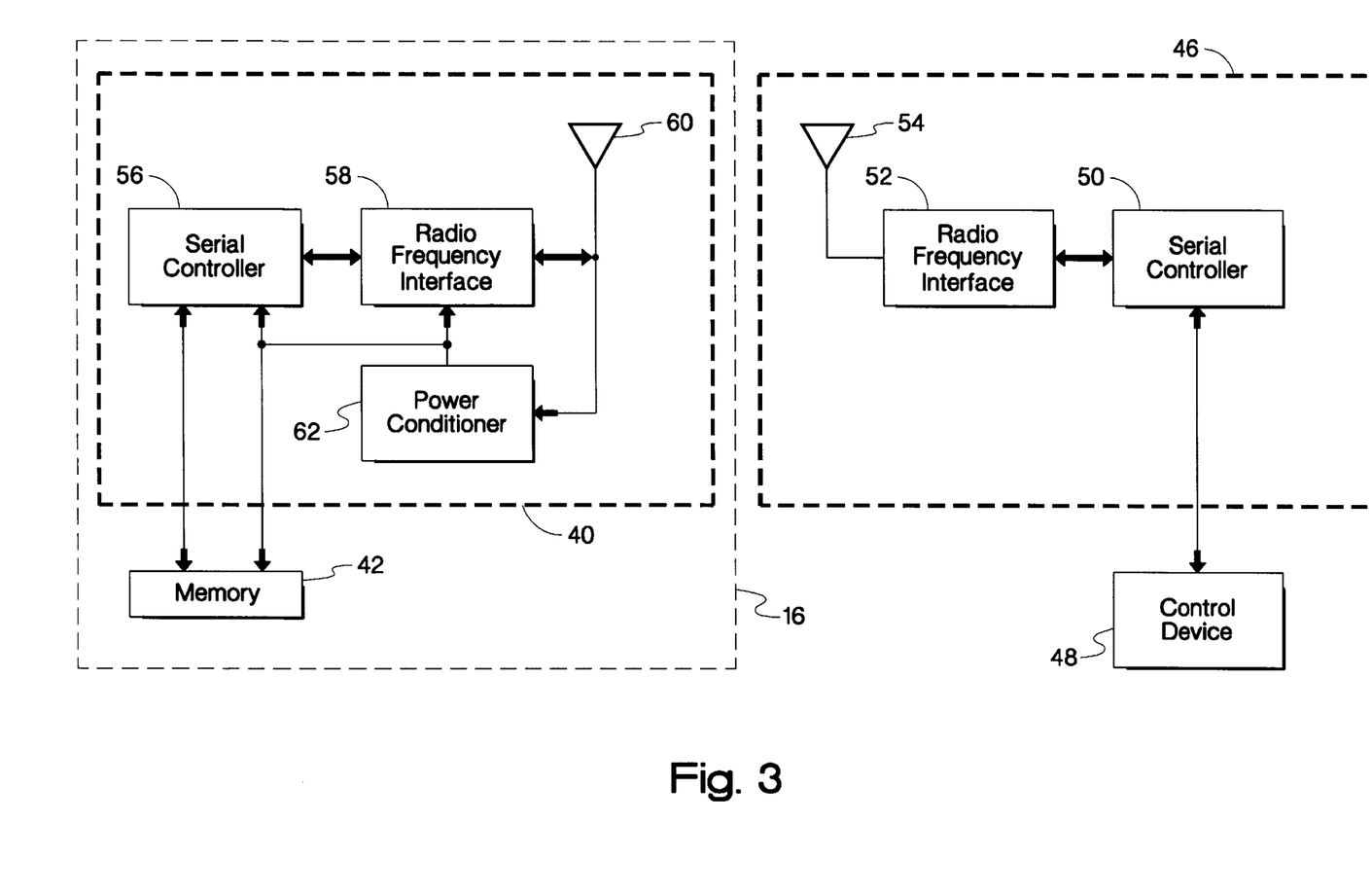
FIG. 3 is a more detailed block diagram of one exemplary embodiment of the linking devices for transferring information to and from a memory associated with the replaceable printing component.

FIG. 3 depicts further detail of the linking devices 40 and 46 of the present invention for transferring information between the reseller programming device 26 and the reseller identification device 16. The linking device 44 associated with the printing system 10, is similar to the linking device 46 associated with the reseller programming device 26, and therefore will not be discussed in detail.

The linking device 46 associated with the reseller programming device 26 includes a serial controller 50, a radio frequency interface 52, and an antenna 54. The serial controller 50 controls the transfer of information between the control device 48 associated with the reseller programming device 26 and the radio frequency interface 52. The serial controller 50 is preferably a microprocessor, a programmable controller or a hardware implemented controller that performs the necessary interface and data manipulation functions for passing information between the control device 48 and the radio frequency interface 52. Information transferred between the control device 48 and the serial controller 50 includes component identification information and reseller identification information that is stored in an electronic storage portion associated with the control device 48. In one preferred embodiment, information is transferred between the serial controller 50 and the control device 48 in a parallel format, and information is transferred between the serial controller 50 and the radio frequency interface 52 in a serial format.

The radio frequency interface 52 receives information from the serial controller 50 in a serial fashion and converts this information into time varying voltages at the antenna 54. These time varying voltages are preferably in a standard radio frequency range such as 125 kilohertz to 13.56 megahertz. Radio frequencies outside this range may also be suitable. Transmission of information using a radio frequency technology is used in financial transaction cards provided by financial institutions for various types of transactions such as banking and using debit cards and credit cards. These financial transaction cards are sometimes referred to as "smart cards". Similar technology is also used in inventory systems that are sometimes referred to as radio frequency identification (RFID) technology.

Alternatively, the linking devices 40, 44 and 46 can be devices for transferring information therebetween using techniques other than radio frequency coupling. For example, the linking devices 40, 44 and 46 can make use of a variety of techniques such as electrostatic, inductive, capacitive or magnetic coupling for transferring information between linking devices 40, 44, and 46.

The linking device 40 associated with the reseller identification device 16 is similar to the linking device 46. The linking device 40 includes a serial controller 56, a radio frequency interface 58 and an antenna 60, each of which are similar to corresponding features of the linking device 46. The voltages are induced on antenna 60 in response to time varying voltages provided to antenna 54. Information is extracted from the time varying voltages induced on antenna 60 by the radio frequency interface 58. Information is passed from the radio frequency interface 58 to the serial controller 56. In response to command information, the serial controller 56 can store information such as component identification and reseller identification information in the electrical storage device 42. In addition, in response to command information, the serial controller retrieves information from the electrical storage device 42 for sending this information to the serial controller 50 in a similar manner.

In the preferred embodiment, the linking device 40 and the electrical storage device 42 associated with the reseller identifying device 16 is either an active device that is powered by a battery or a passive device that stores energy in a storage device such as a capacitor. In the case of a passive device, energy is provided to the capacitor by voltages induced on the antenna 60. In the preferred embodiment, voltages are induced on the antenna 60 due to time varying voltages that are applied to the antenna 54 by the radio frequency interface 52. The induced voltage at the antenna 60 is provided to a power conditioner 62 which converts these time varying voltages into a single polarity voltage that is suitable as a supply voltage for each of the electrical storage device 42, the serial controller 56 and the radio frequency interface 58. In one preferred embodiment, the power conditioner 62 rectifies a time varying voltage that is induced on the antenna 60 and filters this rectified voltage to provide a suitable supply voltage.

To power the linking device 40, a time varying electromagnetic field induces a voltage on antenna 60. The modulation of this time varying electromagnetic field allows information to be transferred to the linking device 40. For example, a carrier signal can be provided by the linking device 46 to induce a time varying voltage at antenna 60. This time varying voltage is rectified and filtered by the power conditioner 62 to provide a supply voltage to the linking device 40 and electrical storage device 42. The radio frequency interface 52 modulates the carrier signal such that by varying the frequency, phase or amplitude, information is transmitted to the linking device 40. The modulation of the carrier signal allows the radio frequency interface 58 to extract information from the carrier signal. Information is transferred in a similar manner from the linking device 40 back to the linking device 46.

Use of a power conditioner 62 on the linking device 40 eliminates the need for a direct power and ground connection between the reseller identification device 16 and the printing system 10. In addition, the use of the power conditioner 62 allows component identification information and reseller identification information to be stored on the replaceable printing component 14 without installing the replaceable printing component 14 in the printing system 10 or some type of programming fixture. Furthermore, because direct electrical interconnection is not required, information can be transferred to and from the replaceable printing component 14 through packaging. Thus the use of radio frequency linking devices 40 and 46 allows component identification information and reseller identification information to be stored or updated in the reseller identification device 16 after the packaging of the replaceable printing component 14.

Figure 4:
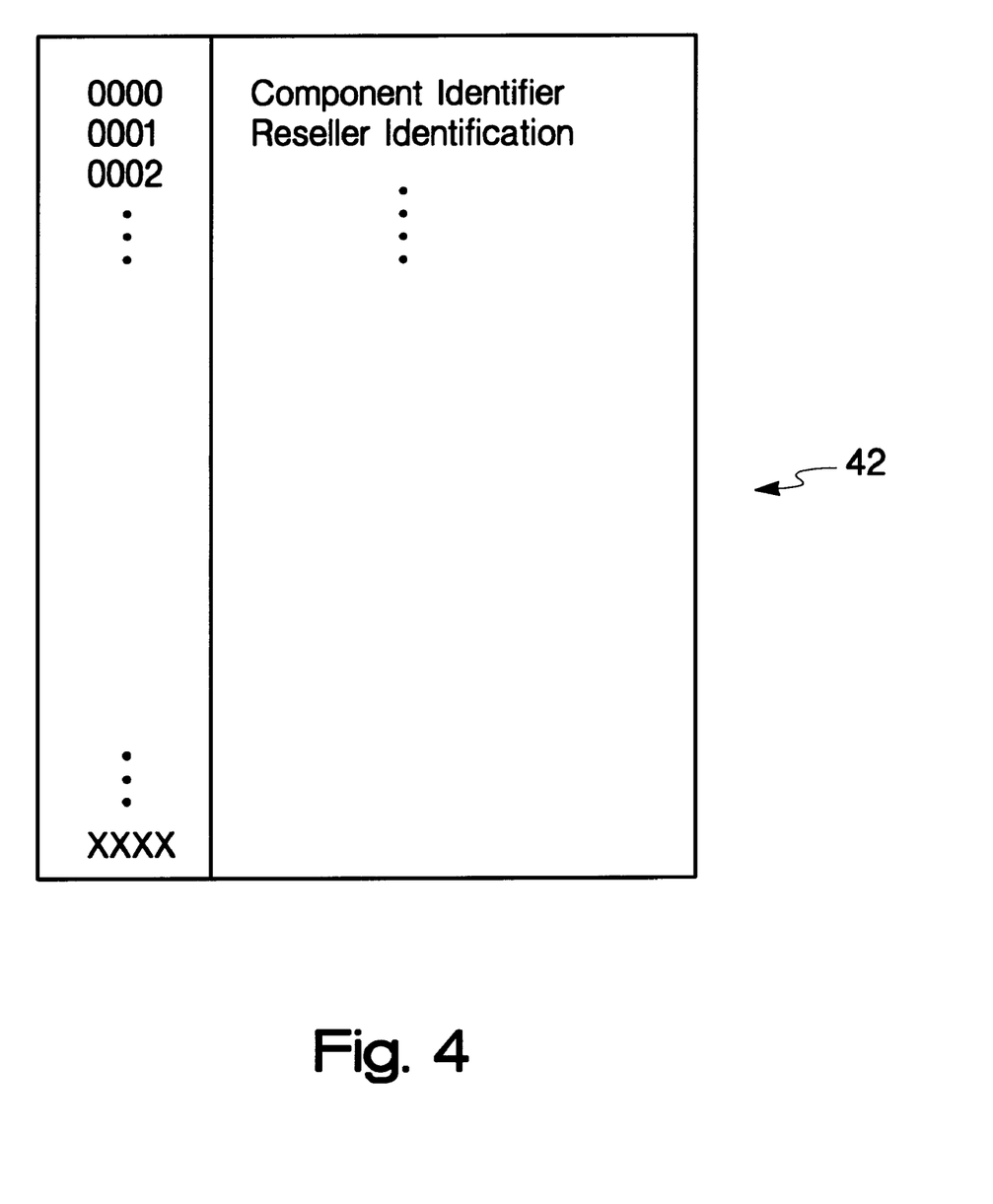
FIG. 4 is a representation of information stored within the memory associated with the replaceable printing component by the reseller or service provider for identifying the reseller.

FIG. 4 is a representation of the contents of the electrical storage device 42 within the reseller identification device 16. The electrical storage device 42 includes a plurality of information storage locations, each having a corresponding memory address. The memory addresses are represented by 0000,0001,0002 up through XXXX. Corresponding to each of these memory addresses is a memory location for storing information. For example, in memory location 0000, component identifier information is stored, and in location 0001, reseller identification information is stored.

The amount of memory locations can vary depending on the number and size of information to be stored in the electrical storage device 42. The locations where each particular piece of information is stored can be different from that shown in FIG. 4. It is important that each of the reseller programming device 26 and the control device 34 associated with the printing system have a map identifying the information for each memory address location so that the proper information can be stored and retrieved from the memory 42. For example, in the event that the reseller programming device 26 stores reseller information in memory location 0001, then the control device 34 retrieves the reseller identification information from memory location 0001 when the printing system 10 or host 24 requests the reseller identification.

Figure 5:
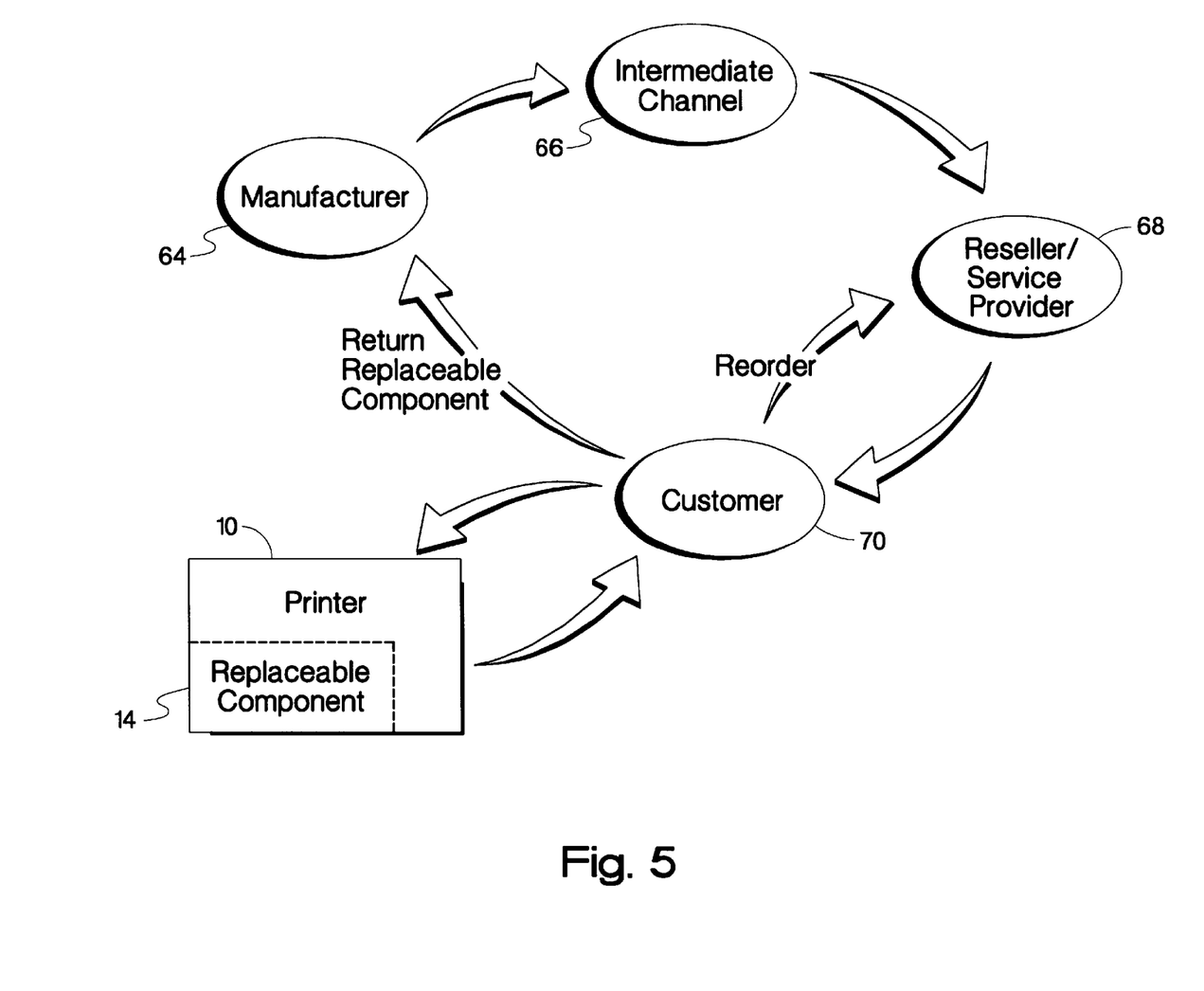
FIG. 5 is a schematic representation of a sales channel that includes an intermediate channel and reseller for the sale of a replaceable printing component of the present invention.

FIG. 5 is a schematic representation of the technique of the present invention for identifying the reseller or service provider of a replaceable printing component 14 so that the customer can properly reorder from the same reseller. The process includes a manufacturer 64 who manufacturers the replaceable printing component 14. The manufacturer 64 sells the replaceable printing component 14 to an intermediate channel 66 which then sells the replaceable printing component 14 to a reseller or service provider 68. The reseller or service provider 68 sells the replaceable printing component 14 to a customer 70. Either the customer 70 or the service provider 68 installs the replaceable printing component 14 into a printing system 10. The path of the replaceable printing component from the manufacturer 64 to the reseller 68 is sometimes referred to as a sales channel. Typically, there are numerous different sales channels available to the manufacturer 64 for selling products to the customer 70.

The intermediate channel 66 typically includes one or more distributors who handle the replaceable printing component 14 prior to the delivery of the replaceable printing component 14 to the reseller 68. Alternatively, the manufacturer 64 can sell the replaceable printing component 14 directly to the reseller 68 or customer 70.

At reorder time, the customer 70 retrieves the reseller identification and component identification information from the replaceable printing component 14 so that the reseller 68 can be identified for reordering the replaceable printing component 14. The component identification information is used to aid the customer 70 in identifying the particular model of the replaceable printing component 14 to ensure that the proper replaceable printing component is reordered.

There are numerous other arrangements in which the reseller information stored in the replaceable printing component 14 can be utilized to order a replacement part. One such arrangement is where the replaceable printing component 14 is returned to the manufacturer 64 who then retrieves the reseller information from the replaceable printing component 14. The manufacturer 64 either sends a replaceable printing component 14 to the customer 70 or contacts the reseller 68 to send a new replaceable printing component 14 to the customer 70. In another arrangement, the manufacturer 64 is identified from the information stored in the replaceable printing component 14. The customer 70 contacts the manufacturer 64 who assists or selects a reseller 68 for the customer 70.

Figure 6:
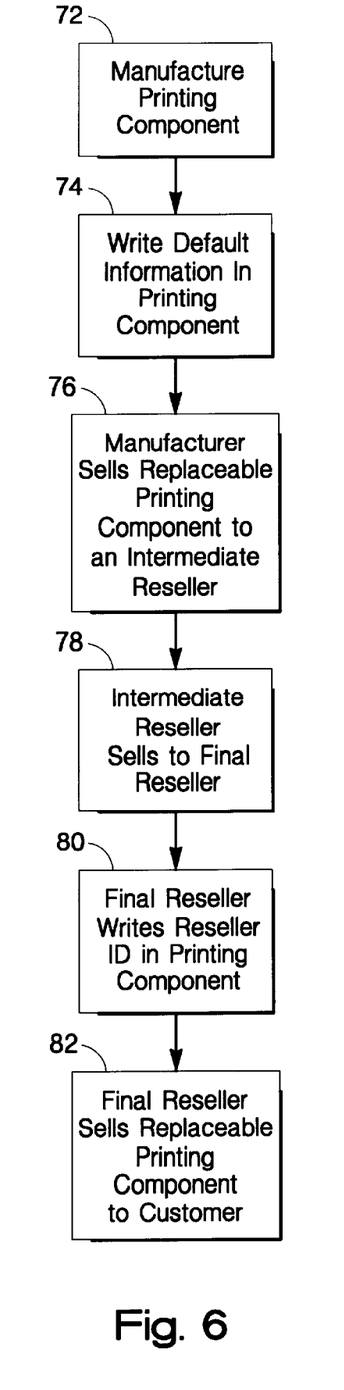
FIG. 6 depicts one exemplary embodiment of the technique of the present invention for storing reseller identification information in the replaceable printing component of the present invention.

FIG. 6 is a flow diagram illustrating the method of the present invention for storing reseller information in the replaceable printing component 14. The process begins by the manufacture of the replaceable printing component 14 as represented by step 72. The manufacturer then writes default information into the replaceable printing component 14 as represented by step 74. The manufacturer 64 makes use of a device such as the reseller programming device 26 shown in FIG. 2 to store this default information in the replaceable printing component 14. This default information may specify a list of resellers 68 that sell the replaceable printing component 14 or this default information may identify a particular reseller 68 that is to receive the replaceable printing component 14. Alternatively, this default information may specify a web address or a URL which points to the reseller 68 or which points to information which the customer can then use to determine the reseller 68 of the replaceable printing component 14.

The manufacturer then sells the replaceable printing component to the distributor or intermediate channel 66 as represented by step 76. The intermediate channel 66 sells the replaceable printing component 14 to a final reseller 68 as represented by step 78. The final reseller 68 then stores the reseller identification information to the printing component 14 as represented by step 80. The reseller identification is any information that is suitable for identifying the sales channel or specific members of the sales channel such as resellers 68, intermediate channel 66 or manufacturer 64.

This reseller identification can include a reseller code that identifies one or more channel members, a telephone number for a channel member, a name of a channel member or an internet address. The embodiment that makes use of the internet address will be discussed in more detail with respect to FIG. 8. The final reseller 68 then sells the replaceable printing component 14 to the customer 70 as represented by step 82.

Additional sales channel information other than the reseller 68 identification can also be stored in the electrical storage device 42 associated with the replaceable printing component 14. This sales channel information can include information identifying the particular sales channel for the replaceable printing component 14. This information stored on the replaceable printing component 14 includes manufacturer 64 identification information, intermediate channel 66 identification information as well a reseller 68 identification information. As the replaceable printing component 14 moves through the sales channel devices such as the reseller programming device 26 are used to store this channel identification information at each step in the sales channel. This information may be helpful for the manufacturer to identify how goods pass through the sales channel. This information may also be useful when stolen replaceable printing components 14 are seized for identifying where in the sales channel these goods were stolen.

Figure 7:
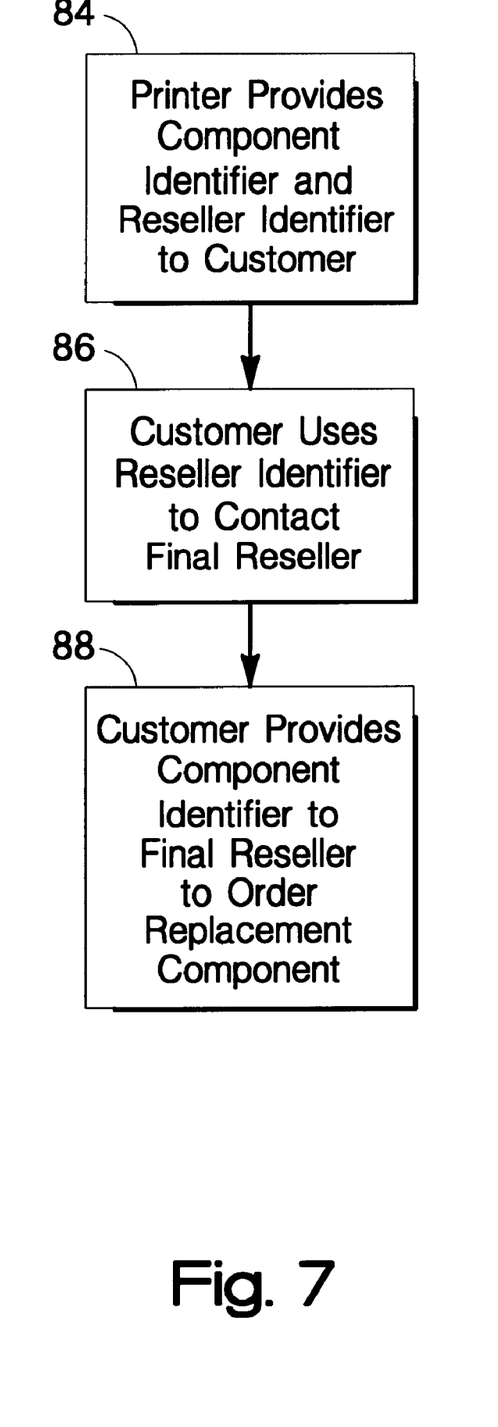
FIG. 7 is a block diagram representing the technique of the present invention for retrieving reseller information from the replaceable printing component of the present invention for reordering the replaceable printing component.

FIG. 7 depicts one preferred technique of the present invention the customer 70 utilizes to reorder a replaceable printing component 14 from the reseller 68. The customer 70 retrieves reseller information from the replaceable printing component 14 to reorder from the reseller 68. One preferred method of implementing this process is shown in FIG. 7. The printing system 10 first provides component identifier information and reseller identifier information to the customer 70 as represented by step 84. The customer 70 uses the reseller identifier to contact the final reseller 68 of the previous replaceable printing component 14. The customer 70 also provides the component identifier information to the final reseller 68 to reorder a replacement replaceable printing component 14 from the reseller as represented by step 88.

Figure 8:
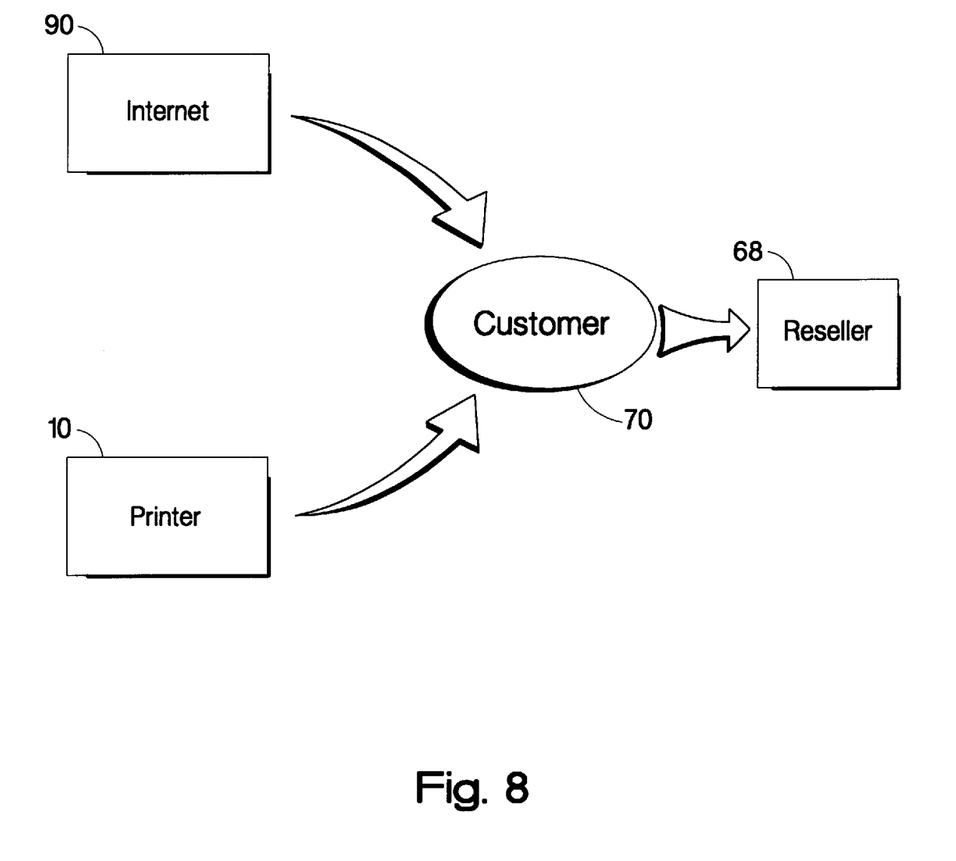
FIG. 8 is a schematic representation of one exemplary technique of the present invention for identifying a reseller of the replaceable printing component.

FIG. 8 represents one preferred embodiment wherein either the manufacturer 64, intermediate channel 66 or reseller 68 stores an internet address, referred to as a URL, on the replaceable printing component 14. The URL information or internet address is provided by the printing system 10 to the customer 70. This internet address is provided automatically by the printer such as when the replaceable printing component 14 is exhausted or upon a request by the customer 70 in a manner similar to how the reseller identification information is provided to the customer 70. Information is provided to the customer 70 either by displaying this URL information on the display device 32 associated with the information source or host 24, or by printing this information on print media using the printer mechanism 38. (See FIG. 2.) The customer 70 can go to this internet address or URL represented by box 90 and retrieve a list of resellers 68 from which to choose. Alternatively, this internet address can be a location to reorder the replaceable printing component 14 from a particular reseller 68. The customer then contacts a reseller 68 for reordering the replaceable printing component 14.

The technique of the present invention makes use of a replaceable printing component 14 that includes a reseller identification device 16 for identifying resellers of the replaceable printing component 14. In the preferred embodiment, the reseller identification device 16 includes a radio frequency link that allows the manufacturer 64, intermediate reseller channel 66 or final reseller 68 to store the reseller information using a suitable radio frequency linking device. The use of a radio frequency linking device for storing reseller information allows the storing of reseller information after packaging of the replaceable printing component 14 by the manufacturer 64. Because the storage of the reseller information does not require opening of the packaging, the manufacturer 64 can use tamper proof packaging to package the replaceable printing component 14.

By providing reseller information with the replaceable printing component 14, the customer 70 always has a source of replacement replaceable printing components 14. Therefore, the reseller information is provided as a convenience to the customer 70. In addition, by identifying the reseller 68, the manufacturer 64 provides some benefit to a particular reseller 68 of its replaceable printing components, thereby providing an incentive to carry the particular manufacturer's replaceable printing components.

The method and apparatus of the present invention have been discussed herein with respect to an inkjet printing system 10. The method and apparatus of the present invention is equally well suited for use in other types of printing systems such as electrophotographic printing systems. In an electrophotographic printing system, the replaceable printing component 14 is a supply of marking material such as toner frequently referred to as a toner cartridge. In addition, the replaceable printing component 14 can also include various components that require replacement over time such as motors, components that make up the electrophotographic print engine such as imaging drums, wipers and fusers, to name a few. The reseller identification device 16 is associated with each of the replaceable printing components 14 such as the toner cartridge for identifying the reseller 68 for reordering replacement toner cartridges.

In one preferred embodiment, the electrical storage device 42, serial controller 56, radio frequency interface 58 and power conditioner 62 of reseller identification device 16 are formed on a substrate such as silicon which is attached to an antenna coil. Both the coil and the substrate are integrated into a label that is adhesively attached to the replaceable printing component 14.

What is claimed is:

1. A replaceable printing component for use in a printing system, the replaceable printing component of the type sold through a plurality of sales channels, the replaceable printing component comprising:

a radio frequency link for receiving information indicative of a particular sales channel of the plurality of sales channels; and an electrical storage device for storing information indicative of the particular sales channel, wherein the electrical storage device provides the information indicative of the particular sales channel to a user of the replaceable printing component for replacing the replaceable printing component having the radio frequency link and the electrical storage device.

2. The replaceable printing component of claim 1 wherein the replaceable printing component includes a reservoir for containing marking material.

3. The replaceable printing component of claim 1 wherein the replaceable printing component is a toner cartridge for printing using an electrophotographic printing process.

4. The replaceable printing component of claim 1 wherein the replaceable printing component is an inkjet print cartridge.

5. The replaceable printing component of claim 1 wherein the radio frequency link receives information in a serial fashion for storage in the electrical storage device.

6. The replaceable printing component of claim 1 wherein the electrical storage device is a semiconductor memory device.

7. The replaceable printing component of claim 1 wherein the information indicative of the particular sales channel includes at least one of reseller identification, intermediate channel identification and manufacturer identification information.

8. The replaceable printing component of claim 1 wherein the information indicative of the particular sales channel includes each of reseller identification, intermediate channel identification and manufacturer identification information.

9. The replaceable printing component of claim 1 wherein the information indicative of the particular sales channel is stored on the electrical storage device at a point of sale of the replaceable printing component.

10. A replaceable printing component for use in a printing system, the replaceable printing component comprising:

a housing; and an electrical storage device coupled to the housing for storing information indicative of a reseller of the replaceable printing component, wherein the electrical storage device provides the information indicative of the reseller to a user of the replaceable printing component for replacing the replaceable printing component having the electrical storage device.

11. The replaceable printing component of claim 10, and further including:

a radio frequency link for receiving a radio frequency signal having information indicative of the reseller of the replaceable printing component.

12. The replaceable printing component of claim 11 wherein the electrical storage device and the radio frequency link are integral with a label that is attached to the housing of the replaceable printing component.

13. The replaceable printing component of claim 10 wherein the housing of the replaceable printing component includes a reservoir for containing marking material.

14. The replaceable printing component of claim 10 wherein the replaceable printing component is a toner cartridge for printing using an electrophotographic printing process.

15. The replaceable printing component of claim 10 wherein the replaceable printing component is an inkjet print cartridge.

* * * * *